United States Patent
Liu (10) Patent No.: US 11,477,750 B2
(45) Date of Patent: Oct. 18, 2022

(54) DATA TRANSMISSION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 36 days.

(21) Appl. No.: 16/910,841

(22) Filed: Jun. 24, 2020

(65) Prior Publication Data
US 2020/0337013 A1    Oct. 22, 2020

Related U.S. Application Data

(63) Continuation of application No. PCT/CN2017/118576, filed on Dec. 26, 2017.

(51) Int. Cl.
*H04W 60/00* (2009.01)
*H04W 8/02* (2009.01)

(52) U.S. Cl.
CPC .......... *H04W 60/00* (2013.01); *H04W 8/02* (2013.01)

(58) Field of Classification Search
CPC ......... H04W 60/00; H04W 8/02; H04W 8/04; H04W 8/14; H04W 60/02; H04W 8/24
See application file for complete search history.

(56) References Cited

U.S. PATENT DOCUMENTS

| 2015/0257115 | A1  | 9/2015  | Jokimies et al. |
|---|---|---|---|
| 2016/0323845 | A1* | 11/2016 | Kim .................... H04W 88/16 |
| 2017/0332356 | A1* | 11/2017 | Tamura ................ H04W 36/12 |
| 2020/0196287 | A1  | 6/2020  | Tamura |

FOREIGN PATENT DOCUMENTS

| CN | 102158901 A  | 8/2011 |
|---|---|---|
| CN | 101047900 B  | 1/2012 |
| CN | 102572816 A  | 7/2012 |
| CN | 102958036 A  | 3/2013 |
| CN | 106576295 A  | 4/2017 |
| CN | 103607793 B  | 8/2017 |
| EP | 3096573 A1   | 11/2016 |
| EP | 3240329 A1   | 11/2017 |

(Continued)

OTHER PUBLICATIONS

First Office Action of the Canadian application No. 3086695, dated Aug. 5, 2021. 3 pages.

(Continued)

*Primary Examiner* — Marcus Hammonds
(74) *Attorney, Agent, or Firm* — Perkins Coie LLP (57) ABSTRACT

A method for data transmission includes that: a first network device receives a registration request message or a registration updating request message from a user equipment (UE); the first network device acquires UE context information and UE data from a second network device based on the registration request message or the registration updating request message; and the first network device sends a registration response message to the UE. A device for data transmission is also provided.

24 Claims, 5 Drawing Sheets

(56) References Cited

FOREIGN PATENT DOCUMENTS

| RU | 2345487 C2 | 1/2009 |
|----|------------|--------|
| WO | 2012097693 A1 | 7/2012 |
| WO | 2017177940 A1 | 10/2017 |

OTHER PUBLICATIONS

International Search Report in the international application No. PCT/CN2017/118576, dated Sep. 18, 2018.
Supplementary European Search Report in the European application No. 17936740.4, dated Oct. 14, 2020.
First Office Action of the Russian application No. 2020121694, dated Dec. 14, 2020.
Written Opinion of the International Search Authority in the international application No. PCT/CN2017/118576, dated Sep. 18, 2018.

\* cited by examiner

DATA TRANSMISSION METHOD AND DEVICE, AND COMPUTER STORAGE MEDIUM

CROSS-REFERENCE TO RELATED APPLICATION

This application is a U.S. continuation application of International Application No. PCT/CN 2017/118576, entitled "DATA TRANSMISSION METHOD AND DEVICE, AND COMPUTER STORAGE MEDIUM", filed on Dec. 26, 2017, the disclosure of which is hereby incorporated by reference in its entirety.

TECHNICAL FIELD

The disclosure relates to the technical field of wireless communications, and particularly to a method and device for data transmission, and a computer storage medium.

BACKGROUND

In a small data transmission manner, infrequent small data may be transmitted in a control plane. Small data is encapsulated in a protocol data unit (PDU) of a non-access stratum (NAS), and is transmitted in the control plane through a NAS message. In an existing protocol, when small data is transmitted between a user equipment (UE) and a network through a control plane, bearer information of the data may be carried.

SUMMARY

For solving the technical problem, embodiments of the disclosure provide a method and device for data transmission, and a computer storage medium.

The embodiments of the disclosure provide a method for data transmission, which may include the following operations.

A first network device receives a registration request message or a registration updating request message from a UE.

The first network device acquires UE context information and UE data from a second network device based on the registration request message or the registration updating request message.

The first network device sends a registration response message to the UE.

The embodiments of the disclosure provide a method for data transmission, which may include the following operations.

UE sends a registration request message or a registration updating request message to a first network device, the registration request message or the registration updating request message being used to trigger the first network device to acquire UE context information and UE data from a second network device.

The UE receives a registration response message from the first network device.

The embodiments of the disclosure provide a device for data transmission, which may include a receiving unit, a first acquisition unit, a second acquisition unit and a first sending unit.

The receiving unit may be configured to receive a registration request message or a registration updating request message from a UE.

The first acquisition unit may be configured to acquire UE context information from a second network device based on the registration request message or the registration updating request message.

The second acquisition unit may be configured to acquire UE data from the second network device.

The first sending unit may be configured to send a registration response message to the UE.

The embodiments of the disclosure provide a device for data transmission, which may include a sending unit and a first receiving unit.

The sending unit may be configured to send a registration request message or a registration updating request message to a first network device. The registration request message or the registration updating request message is used to trigger the first network device to acquire UE context information and UE data from a second network device.

The first receiving unit may be configured to receive a registration response message from the first network device.

These aspects or other aspects of the disclosure will become clearer and easier to understand through the following descriptions about the embodiments.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

In the related art, a concurrent process may occur during data transmission. For example, UE moves from an old network device to a new network device, and in such case, the UE is required to execute a registration updating process. How to implement data transmission in a concurrent process is a problem to be solved.

Figure 1:
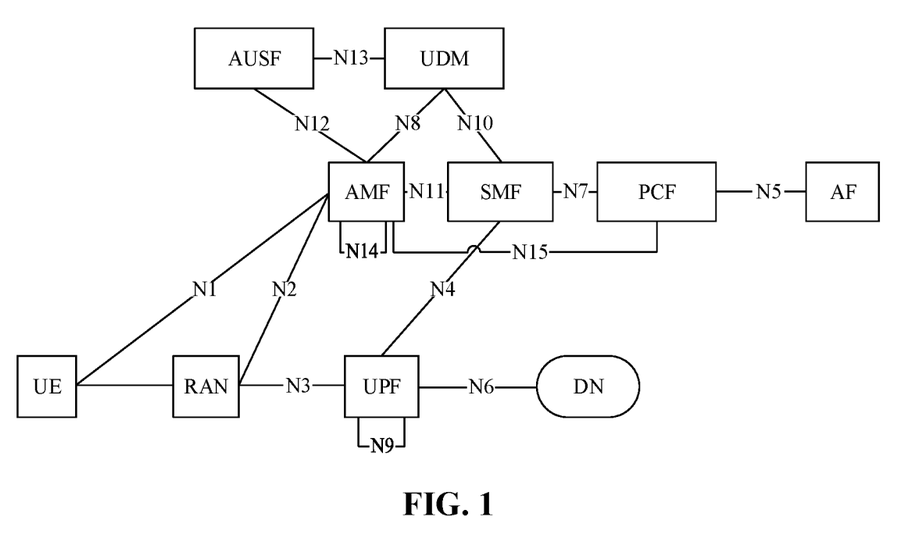
FIG. 1 is a system architecture diagram of a 5th-Generation (5G) network according to an embodiment of the disclosure.

FIG. 1 is a system architecture diagram of a 5G network according to an embodiment of the disclosure. As illustrated in FIG. 1, devices involved in a 5G network system include:

UE, a radio access network (RAN), a user plane function (UPF), a data network (DN), a core access and mobility management function entity (AMF), a session management function entity (SMF), a policy control function entity (PCF), an application function entity (AF), an authentication server function entity (AUSF) and unified data management entity (UDM).

Figure 2:
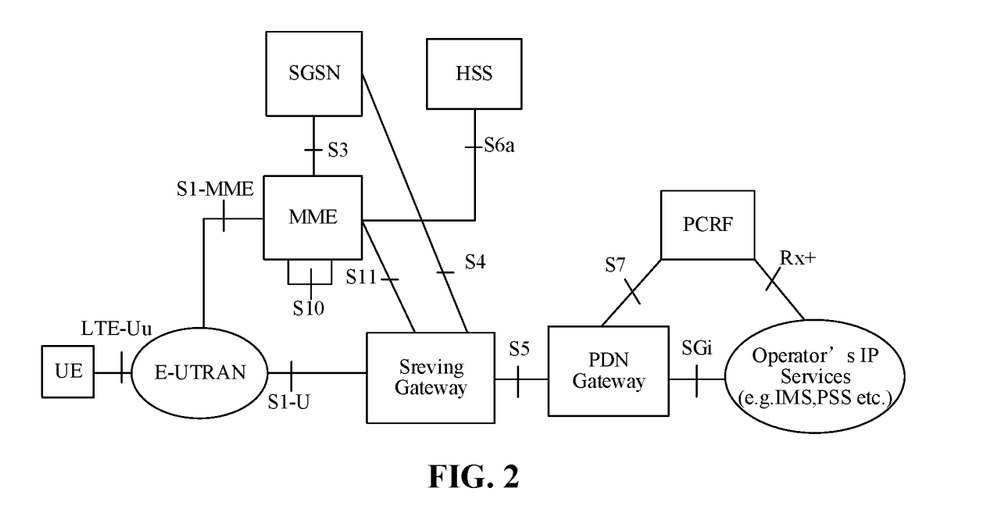
FIG. 2 is a system architecture diagram of a 4th-Generation (4G) network according to an embodiment of the disclosure.

FIG. 2 is a system architecture diagram of a 4G network according to an embodiment of the disclosure. As illustrated in FIG. 2, devices involved in a 4G network system include:

UE, an evolved universal terrestrial radio access network (E-UTRAN), a mobility management entity (MME) network element, a serving general packet radio service (GPRS) support node (SGSN), a home subscriber server (HSS), a serving gateway, a packet data network (PDN) gateway and a policy and charging rules function entity (PCRF).

The examples of FIG. 1 and FIG. 2 are only cases of network architectures for implementing the embodiments of the disclosure. The embodiments of the disclosure are not limited to the network structures illustrated in FIG. 1 and FIG. 2.

Figure 3:
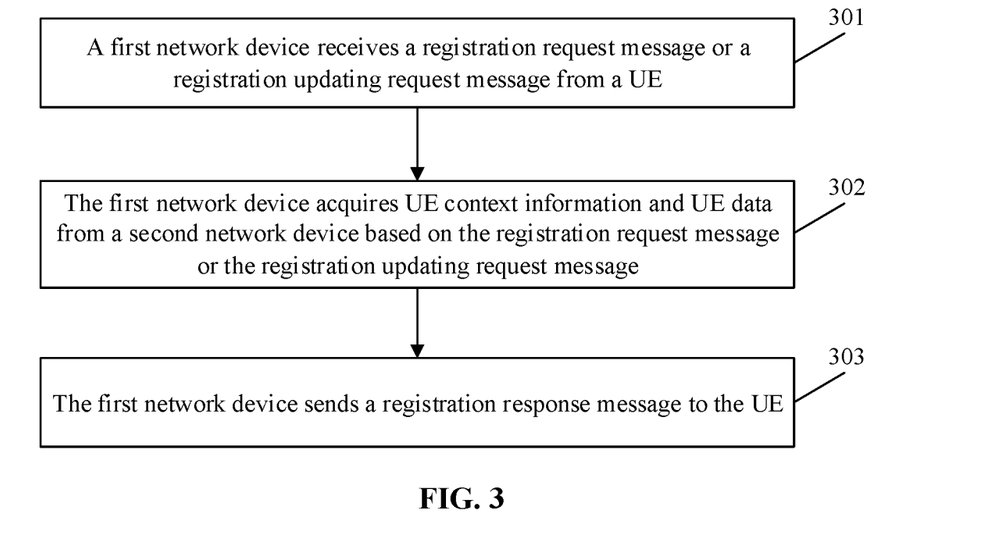
FIG. 3 is a first flowchart of a method for data transmission according to an embodiment of the disclosure.

FIG. 3 is a first flowchart of a method for data transmission according to an embodiment of the disclosure. As illustrated in FIG. 3, the method for data transmission includes the following operations.

In 301, a first network device receives a registration request message or a registration updating request message from a UE.

In the embodiment of the disclosure, the first network device and a second network device may be devices on an access network side, for example, a gNB in a 5G system, an Evolved Node B (eNB) in a 4G system and the like. In addition, a device on a core network side may be called a third network device.

If the UE is in a service area corresponding to the second network device, the UE performs data transmission with the second network device. When the UE moves from the service area corresponding to the second network device to a service area corresponding to the first network device, the UE initiates a registration updating process, namely the UE sends the registration request message or the registration updating request message to the first network device. Correspondingly, when the UE moves from the service area corresponding to the second network device to the service area corresponding to the first network device, the first network device receives the registration request message or registration updating request message sent by the UE.

In the solution, the second network device is a network device originally providing service for the UE, the second network device is also called an old network device. Similarly, the first network device is a network device presently providing service for the UE, the first network device is also called a new network device.

In 302, the first network device acquires UE context information and UE data from a second network device based on the registration request message or the registration updating request message.

In an implementation, the registration request message or the registration updating request message carries information of the second network device. The first network device, when receiving the registration request message or registration updating request message from the UE, extracts the information of the second network device from the registration request message or the registration updating request message, and acquires the UE context information from the second network device based on the information of the second network device.

The first network device sends a UE context information acquisition request message to the second network device based on the information of the second network device, and receives the UE context information from the second network device.

In addition, since the second network device has performed data transmission with the UE before, UE data is also stored in the second network device. In an implementation, the registration request message or the registration updating request message carries first indication information. The first indication information is to indicate whether to acquire the UE data from the second network device.

Correspondingly, the first network device extracts the first indication information from the registration request message or the registration updating request message. The first network device determines whether to acquire the UE data from the second network device or not based on the first indication information. Responsive to determining to acquire the UE data from the second network device, the first network device sends a UE data acquisition request message to the second network device. The first network device receives the UE data from the second network device.

In an implementation, the registration request or the registration updating request message may further carry UE uplink data. Correspondingly, the first network device extracts the UE uplink data from the registration request message or the registration updating request message and caches the UE uplink data. The first network device, after obtaining the UE context information, sends the cached UE uplink data to the third network device.

In the solution, in a case that the first network device does not acquire the UE context information, the first network device rejects the registration request message or registration updating request message sent by the UE, and sends second indication information to the UE. The second indication information is to indicate that the UE uplink data is not sent to the third network device.

In 303, the first network device sends a registration response message to the UE.

In an implementation, the registration response message may carry UE downlink data.

Figure 4:
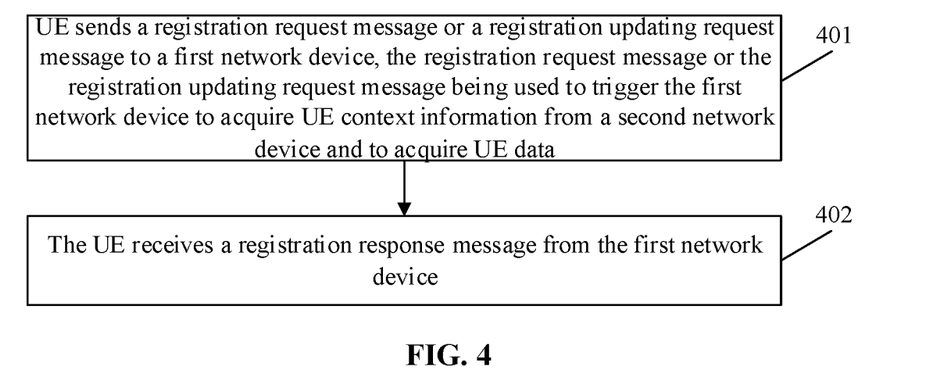
FIG. 4 is a second flowchart of a method for data transmission according to an embodiment of the disclosure.

FIG. 4 is a second flowchart of a method for data transmission according to an embodiment of the disclosure. As illustrated in FIG. 4, the method for data transmission includes the following operations.

In 401, UE sends a registration request message or a registration updating request message to a first network device. The registration request message or the registration updating request message is used to trigger the first network device to acquire UE context information and UE data from a second network device.

In the embodiment of the disclosure, the UE may be any device capable of communicating with a network, such as a mobile phone, a tablet computer, a notebook computer and a desktop computer.

In the embodiment of the disclosure, when the UE moves from a service area corresponding to the second network device to a service area corresponding to the first network device, the UE sends the registration request message or the registration updating request message to the first network device.

In an implementation, the registration request message or the registration updating request message carries information of the second network device.

Correspondingly, the first network device, when receiving the registration request message or registration updating request message sent by the UE, extracts the information of the second network device from the registration request message or the registration updating request message, and acquires the UE context information from the second network device based on the information of the second network device. Furthermore, the first network device sends a UE context information acquisition request message to the second network device based on the information of the second network device, and receives the UE context information from the second network device.

In addition, since the second network device has performed data transmission with the UE before, UE data is also stored in the second network device. In an implementation, the registration request message or the registration updating request message carries first indication information. The first indication information is to indicate whether to acquire the UE data from the second network device.

Correspondingly, the first network device extracts the first indication information from the registration request message or the registration updating request message. The first network device determines whether to acquire the UE data from the second network device based on the first indication information. Responsive to determining to acquire the UE data from the second network device, the first network device sends a UE data acquisition request message to the second network device. The first network device receives the UE data from the second network device.

In an implementation, the registration request message or the registration updating request message carries UE uplink data.

Correspondingly, the first network device extracts the UE uplink data from the registration request message or the registration updating request message, and caches the UE uplink data. The first network device, after obtaining the UE context information, sends the cached UE uplink data to a third network device.

In 402, the UE receives a registration response message from the first network device.

In the solution, if the first network device does not acquire the UE context information, the first network device rejects the registration request message or registration updating request message of the UE, and sends second indication information to the UE. The second indication information is to indicate that the UE uplink data is not sent to the third network device.

Correspondingly, the UE receives the second indication information from the first network device. The second indication information is to indicate that the UE uplink data is not sent to the third network device.

In an implementation, the registration response message may carry UE downlink data.

Figure 5:
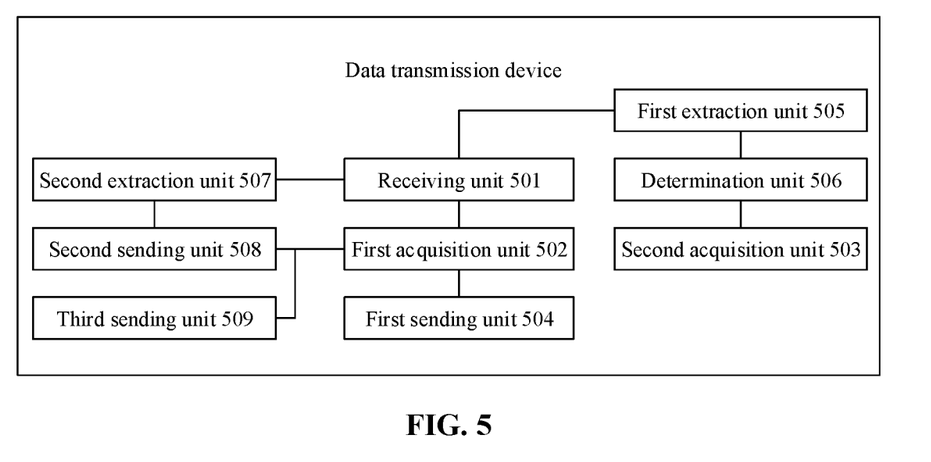
FIG. 5 is a first structure composition diagram of a device for data transmission according to an embodiment of the disclosure.

FIG. 5 is a first structure composition diagram of a device for data transmission according to an embodiment of the disclosure. As illustrated in FIG. 5, the device for data transmission includes a receiving unit 501, a first acquisition unit 502, a second acquisition unit 503, and a first sending unit 504.

The receiving unit 501 is configured to receive a registration request message or a registration updating request message from a UE.

The first acquisition unit 502 is configured to acquire UE context information from a second network device based on the registration request message or the registration updating request message.

The second acquisition unit 503 is configured to acquire UE data from the second network device.

The first sending unit 504 is configured to send a registration response message to the UE.

In an implementation, when the UE moves from a service area corresponding to the second network device to a service area corresponding to a first network device, the receiving unit 501 receives the registration request message or registration updating request message from the UE.

In an implementation, the registration request message or the registration updating request message carries information of the second network device.

The first acquisition unit 502 is configured to: extract the information of the second network device from the registration request message or the registration updating request message, and acquire the UE context information from the second network device based on the information of the second network device.

In an implementation, the first acquisition unit 502 is configured to: send a UE context information acquisition request message to the second network device based on the information of the second network device, and receive the UE context information from the second network device.

In an implementation, the registration request message or the registration updating request message carries first indication information. The first indication information is to indicate whether to acquire the UE data from the second network device.

The device for data transmission further includes a first extraction unit 505 and a determination unit 506.

The first extraction unit 505 is configured to extract the first indication information from the registration request message or the registration updating request message.

The determination unit 506 is configured to determine whether to acquire the UE data from the second network device based on the first indication information.

The second acquisition unit 503 is configured to, responsive to determining to acquire the UE data from the second network device, send a UE data acquisition request message to the second network device, and receive the UE data from the second network device.

In an implementation, the registration request message or the registration updating request message carries UE uplink data.

The device further includes a second extraction unit 507 and a second sending unit 508.

The second extraction unit 507 is configured to: extract the UE uplink data from the registration request message or the registration updating request message, and cache the UE uplink data.

The second sending unit 508 is configured to, after the first acquisition unit 502 acquires the UE context information, send the cached UE uplink data to a third network device.

In an implementation, the device further includes a third sending unit 509.

The third sending unit 509 is configured to, in a case that the first acquisition unit does not acquire the UE context information, reject the registration request message or registration updating request message sent by the UE, and send second indication information to the UE. The second indication information is to indicate that the UE uplink data is not sent to the third network device.

In an implementation, the registration response message may carry UE downlink data.

Those skilled in the art should know that functions realized by each unit in the device for data transmission illustrated in FIG. 5 may be understood with reference to related descriptions about the method for data transmission. The functions of each unit in the device for data transmission illustrated in FIG. 5 may be realized through a program running in a processor, and may also be realized through a specific logical circuit.

Figure 6:
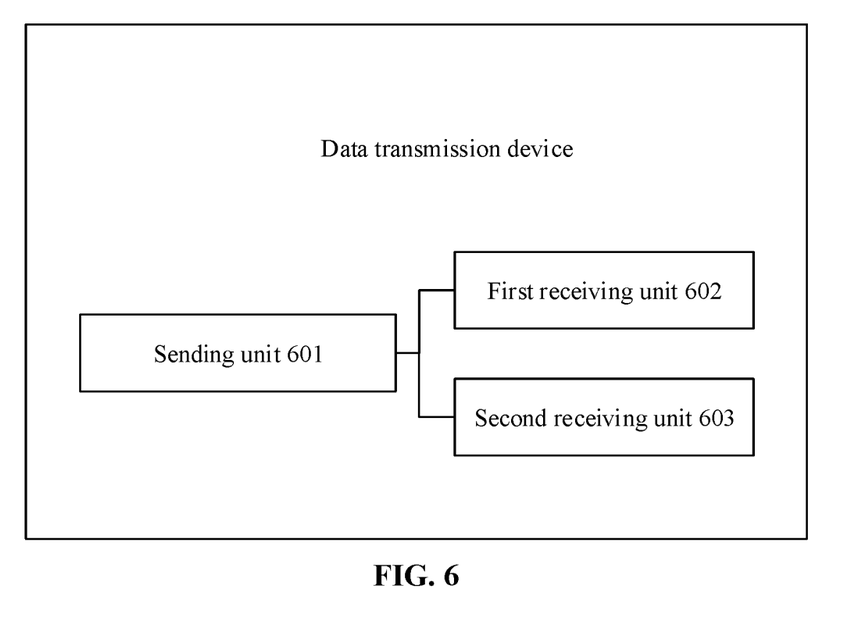
FIG. 6 is a second structure composition diagram of a device for data transmission according to an embodiment of the disclosure.

FIG. 6 is a second structure composition diagram of a device for data transmission according to an embodiment of the disclosure. As illustrated in FIG. 6, the device for data transmission includes a sending unit 601 and a first receiving unit 602.

The sending unit 601 is configured to send a registration request message or a registration updating request message to a first network device. The registration request message or the registration updating request message is used to trigger the first network device to acquire UE context information and UE data from a second network device.

The first receiving unit 602 is configured to receive a registration response message from the first network device.

In an implementation, when UE moves from a service area corresponding to the second network device to a service area corresponding to the first network device, the sending unit 601 sends the registration request message or the registration updating request message to the first network device.

In an implementation, the registration request message or the registration updating request message carries information of the second network device.

In an implementation, the registration request message or the registration updating request message carries first indication information. The first indication information is used to indicate whether to acquire the UE data from the second network device.

In an implementation, the registration request message or the registration updating request message carries UE uplink data.

In an implementation, the device further includes a second receiving unit 603.

The second receiving unit 603 is configured to receive second indication information from the first network device. The second indication information is to indicate that the UE uplink data is not sent to a third network device.

In an implementation, the registration response message may carry UE downlink data.

Those skilled in the art should know that functions realized by each unit in the device for data transmission illustrated in FIG. 6 may be understood with reference to related descriptions about the method for data transmission. The functions of each unit in the device for data transmission illustrated in FIG. 6 may be realized through a program running in a processor, and may also be realized through a specific logical circuit.

When being implemented in form of software functional module and sold or used as an independent product, the data transmission device of the embodiments of the disclosure may also be stored in a computer-readable storage medium. Based on such an understanding, the technical solutions of the embodiments of the disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a read only memory (ROM), a magnetic disk or an optical disk. Therefore, the embodiments of the disclosure are not limited to any specific hardware and software combination.

Correspondingly, the embodiments of the disclosure also provide a computer storage medium having stored therein computer-executable instructions that, when executed by a processor, cause the processor to perform the data transmission method of the embodiments of the disclosure.

Figure 7:
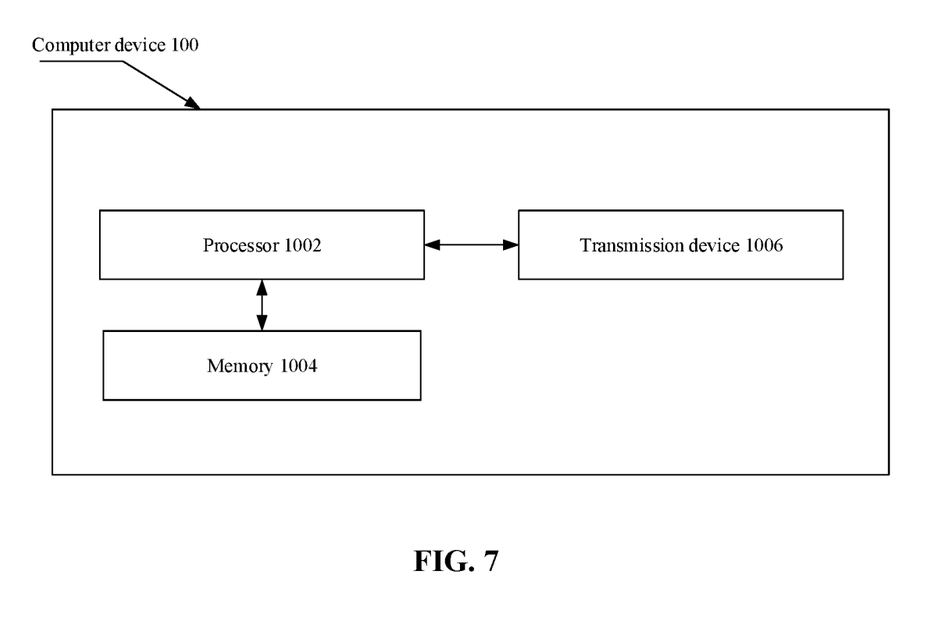
FIG. 7 is a structure composition diagram of a computer device according to an embodiment of the disclosure.

FIG. 7 is a structure composition diagram of a computer device according to an embodiment of the disclosure. The computer device of the embodiment of the disclosure may be UE and may also be a network device. As illustrated in FIG. 7, the computer device 100 may include one or more (only one is illustrated in the figure) processors 1002 (the processor 1002 may include, but not limited to, a processing device such as a micro controller unit (MCU) or a field programmable gate array (FPGA)), a memory 1004 configured to store data, and a transmission device 1006 configured for a communication function. Those of ordinary skill in the art should know that the structure illustrated in FIG. 7 is only schematic and not intended to limit the structure of the electronic device. For example, the computer device 100 may further include components more or fewer than the components illustrated in FIG. 7 or has a configuration different from that illustrated in FIG. 7.

The memory 1004 may be configured to store a software program of application software and a module, for example, program instructions/modules corresponding to a data transmission method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a network interface controller (NIC), which may be connected with another network device through a base station, thereby communicating with the Internet. In an example, the transmission device 1006 may be a radio frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for data transmission, comprising:
receiving, by a first network device, a registration request message or a registration updating request message from a user equipment (UE);
acquiring, by the first network device, UE context information and UE data from a second network device based on the registration request message or the registration updating request message; and
sending, by the first network device, a registration response message to the UE;
wherein the registration request message or the registration updating request message carries UE uplink data, and
wherein the method further comprises:
extracting, by the first network device, the UE uplink data from the registration request message or the registration updating request message, and caching, by the first network device, the UE uplink data;
sending, by the first network device, the cached UE uplink data to a third network device after acquiring the UE context information; and
in a case that the first network device does not acquire the UE context information, rejecting, by the first network device, the registration request message or registration updating request message sent by the UE, and sending, by the first network device, second indication information to the UE, wherein the second indication information is used to indicate that the UE uplink data is not sent to the third network device.

2. The method of claim 1, wherein receiving, by the first network device, the registration request message or the registration updating request message from the UE comprises:
receiving, by the first network device, the registration request message or the registration updating request message from the UE when the UE moves from a service area corresponding to the second network device to a service area corresponding to the first network device.

3. The method of claim 1, wherein the registration request message or the registration updating request message carries information of the second network device; and
wherein acquiring, by the first network device, the UE context information from the second network device based on the registration request message or the registration updating request message comprises:
extracting, by the first network device, the information of the second network device from the registration request message or the registration updating request message; and
acquiring, by the first network device, the UE context information from the second network device based on the information of the second network device.

4. The method of claim 3, wherein acquiring the UE context information from the second network device based on the information of the second network device comprises:
sending, by the first network device, a UE context information acquisition request message to the second network device based on the information of the second network device; and
receiving, by the first network device, the UE context information from the second network device.

5. The method of claim 1, wherein the registration request message or the registration updating request message carries first indication information, the first indication information being used to indicate whether to acquire the UE data from the second network device, and
wherein the method further comprises:
extracting, by the first network device, the first indication information from the registration request message or the registration updating request message;
determining, by the first network device, whether to acquire the UE data from the second network device based on the first indication information;
responsive to determining to acquire the UE data from the second network device, sending, by the first network device, a UE data acquisition request message to the second network device; and
receiving, by the first network device, the UE data from the second network device.

6. The method of claim 1, wherein the registration response message carries UE downlink data.

7. A method for data transmission, comprising:
sending, by a user equipment (UE), a registration request message or a registration updating request message to a first network device, wherein the registration request message or the registration updating request message is used to trigger the first network device to acquire UE context information and UE data from a second network device; and
receiving, by the UE, a registration response message from the first network device,
wherein the method further comprises:
receiving, by the UE, second indication information from the first network device, wherein the second indication information is used to indicate that the UE uplink data is not sent to a third network device.

8. The method of claim 7, wherein sending, by the UE, the registration request message or the registration updating request message to the first network device comprises:
sending, by the UE, the registration request message or the registration updating request message to the first network device when the UE moves from a service area corresponding to the second network device to a service area corresponding to the first network device.

9. The method of claim 7, wherein the registration request message or the registration updating request message carries information of the second network device.

10. The method of claim 7, wherein the registration request message or the registration updating request message carries first indication information, the first indication information being used to indicate whether to acquire the UE data from the second network device.

11. The method of claim 7, wherein the registration request message or the registration updating request message carries UE uplink data.

12. The method of claim 7, wherein the registration response message carries UE downlink data.

13. A device for data transmission, comprising:
a processor; and
a memory storing computer readable instructions executable by the processor,
wherein the processor is configured to:
receive, through a transceiver, a registration request message or a registration updating request message from a user equipment (UE);
acquire UE context information from a second network device based on the registration request message or the registration updating request message;
acquire UE data from the second network device; and
send, through the transceiver, a registration response message to the UE,
wherein the registration request message or the registration updating request message carries UE uplink data;
wherein the processor is further configured to:
extract the UE uplink data from the registration request message or the registration updating request message;
cache the UE uplink data, and
send, through the transceiver, the cached UE uplink data to a third network device after the UE context information is acquired; and
wherein the processor is further configured to:
in a case that the UE context information is not acquired, reject the registration request message or registration updating request message sent by the UE, and send, through the transceiver, second indication information to the UE, wherein the second indication information is used to indicate that the UE uplink data is not sent to the third network device.

14. The device of claim 13, wherein the processor is further configured to receive, through the transceiver, the registration request message or the registration updating request message from the UE when the UE moves from a service area corresponding to the second network device to a service area corresponding to a first network device.

15. The device of claim 13, wherein the registration request message or the registration updating request message carries information of the second network device; and
the processor is configured to:
extract the information of the second network device from the registration request message or the registration updating request message; and
acquire the UE context information from the second network device based on the information of the second network device.

16. The device of claim 15, wherein the processor is configured to:

send, through the transceiver, a UE context information acquisition request message to the second network device based on the information of the second network device; and
receive, through the transceiver, the UE context information from the second network device.

17. The device of claim 13, wherein the registration request message or the registration updating request message carries first indication information, the first indication information being used to indicate whether to acquire the UE data from the second network device; and
wherein the processor is further configured to:
extract the first indication information from the registration request message or the registration updating request message, and
determine whether to acquire the UE data from the second network device based on the first indication information;
responsive to determining to acquire the UE data from the second network device, send, through the transceiver, a UE data acquisition request message to the second network device; and
receive, through the transceiver, the UE data from the second network device.

18. The device of claim 13, wherein the registration response message carries UE downlink data.

19. A device for data transmission, comprising:
a processor; and
a memory storing computer readable instructions executable by the processor,
wherein the processor is configured to:
send, through a transceiver, a registration request message or a registration updating request message to a first network device, wherein the registration request message or the registration updating request message is used to trigger the first network device to acquire user equipment (UE) context information and UE data from a second network device; and
receive, through the transceiver, a registration response message from the first network device,
wherein the processor is further configured to:
receive, through the transceiver, second indication information from the first network device, wherein the second indication information is used to indicate that the UE uplink data is not sent to a third network device.

20. The device of claim 19, wherein the processor is further configured to send, through the transceiver, the registration request message or the registration updating request message to the first network device when the UE moves from a service area corresponding to the second network device to a service area corresponding to a first network device.

21. The device of claim 19, wherein the registration request message or the registration updating request message carries information of the second network device.

22. The device of claim 19, wherein the registration request message or the registration updating request message carries first indication information, the first indication information being used to indicate whether to acquire the UE data from the second network device.

23. The device of claim 19, wherein the registration request message or the registration updating request message carries UE uplink data.

24. The device of claim 19, wherein the registration response message carries UE downlink data.

* * * * *